United States Patent [19]

Nguyen

[11] Patent Number: 5,857,529

[45] Date of Patent: Jan. 12, 1999

[54] WEED UPROOTER

[76] Inventor: Tranh T. Nguyen, 1552 Magnolia Ave., Rohnert Park, Calif. 94928

[21] Appl. No.: 722,855

[22] Filed: Sep. 26, 1996

[51] Int. Cl.[6] .......................................................... A01B 1/16
[52] U.S. Cl. ......................... 172/3.78; 172/371; 294/50.8
[58] Field of Search ..................... 172/371, 372, 172/378, 380; 294/50.8, 50.9; 56/239, 243

[56] References Cited

U.S. PATENT DOCUMENTS

| | | | |
|---|---|---|---|
| 4,673,165 | 6/1987 | Nelson et al. | 294/50.8 X |
| 4,856,759 | 8/1989 | Ness | 294/50.9 X |
| 5,402,853 | 4/1995 | Tauber | 172/378 |
| 5,476,298 | 12/1995 | Etemadian | 294/50.8 |

*Primary Examiner*—Michael J. Carone
*Assistant Examiner*—Robert Pezzuto

[57] ABSTRACT

An apparatus for uprooting weeds comprising a rotatable handle, a base, a rotatable contacting assembly co-axial with the handle, and a co-axial co-directional rotation multiplying assembly linking the handle to the contacting means wherein the rotation of the contacting means is many times the rotation of the handle so that the weed uprooting action can be achieved by pulling the handle pependicularly by a short distance.

26 Claims, 3 Drawing Sheets

WEED UPROOTER

BACKGROUND—FIELD OF INVENTION

The present invention relates generally to uprooting or prying devices, and specifically to a garden tool to pull weed out of the ground.

BACKGROUND—DESCRIPTION OF PRIOR ART

Weed pullers can be found in virtually every garden as weeds can grow anywhere any time in any soil and weather condition since the sad moment when Adam and Eve ate the forbidden fruit. As one of the punishments, God cursed the land and Adam and we, his descendants, have to work the soil to grow grains and vegetables.

There are many weed pullers available on the market, from the simple weeder which is a steel rod with a forked end to the "Weed Popper" which makes use of multiple needles mounted into an assembly pivoting around an axis. The user of this weeder steps on a pedal which rotates the needle assembly upward, making a 2" hole in the ground in the process of pulling out the weed. This weeder requires many movements to pop a weed: pushing the needles into the ground with a foot, then using the same foot in a different position and movement to step on a pedal to make a good-size hole around the weed to remove it, then removing the dirt stuck to the needle assembly, by hand or by foot or other means. An old lady using this device may lose her balance while using her foot to maneuver the weed popper.

Another weed puller called "Eagle Claws" comprises four claws that the user pushes into the ground around the weed with his foot on a step, then he has to rotate the whole tool around its shaft with his two hand on a handlebar. The handlebar does provide some torque leverage. However, that same torque is also applied to the body of user. This requires him to have a solid stance such as with spread legs while risking damaging his back if the effort is very strenuous. Again many difficult movements are required in the operation of this garden tool, which is more of a clumsy cultivator than a weed puller.

So far all of prior arts seem to require rather difficult movements and much effort from the user for the simple task of removing a weed from the ground, and these devices seem to require complex assembly and/or manual welding.

OBJECTS AND ADVANTAGES

Accordingly, several objects and advantages of this invention are:

(a) to provide an easy way of pulling weeds requiring minimum skill and effort from the user, (b) to provide a weed puller that does not make a sizable hole in the ground each time, (c) to provide a weed puller that can be used from an upright position of the user, (d) to provide a weed puller with which the user can pull a handle by a short distance to pop the weed out of the ground.

Further objects and advantages of this invention will become apparent from a consideration of the drawings and ensuing description.

Figure 1:
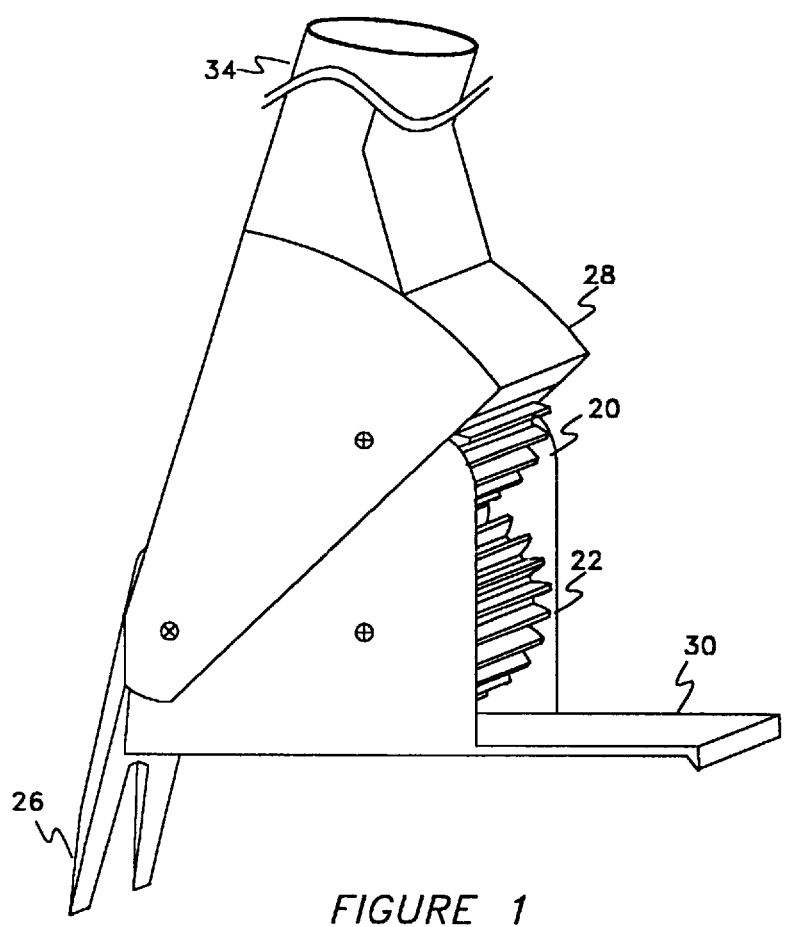
FIG. 1 is a perspective view of the weed puller of the present invention.
Figure 2:
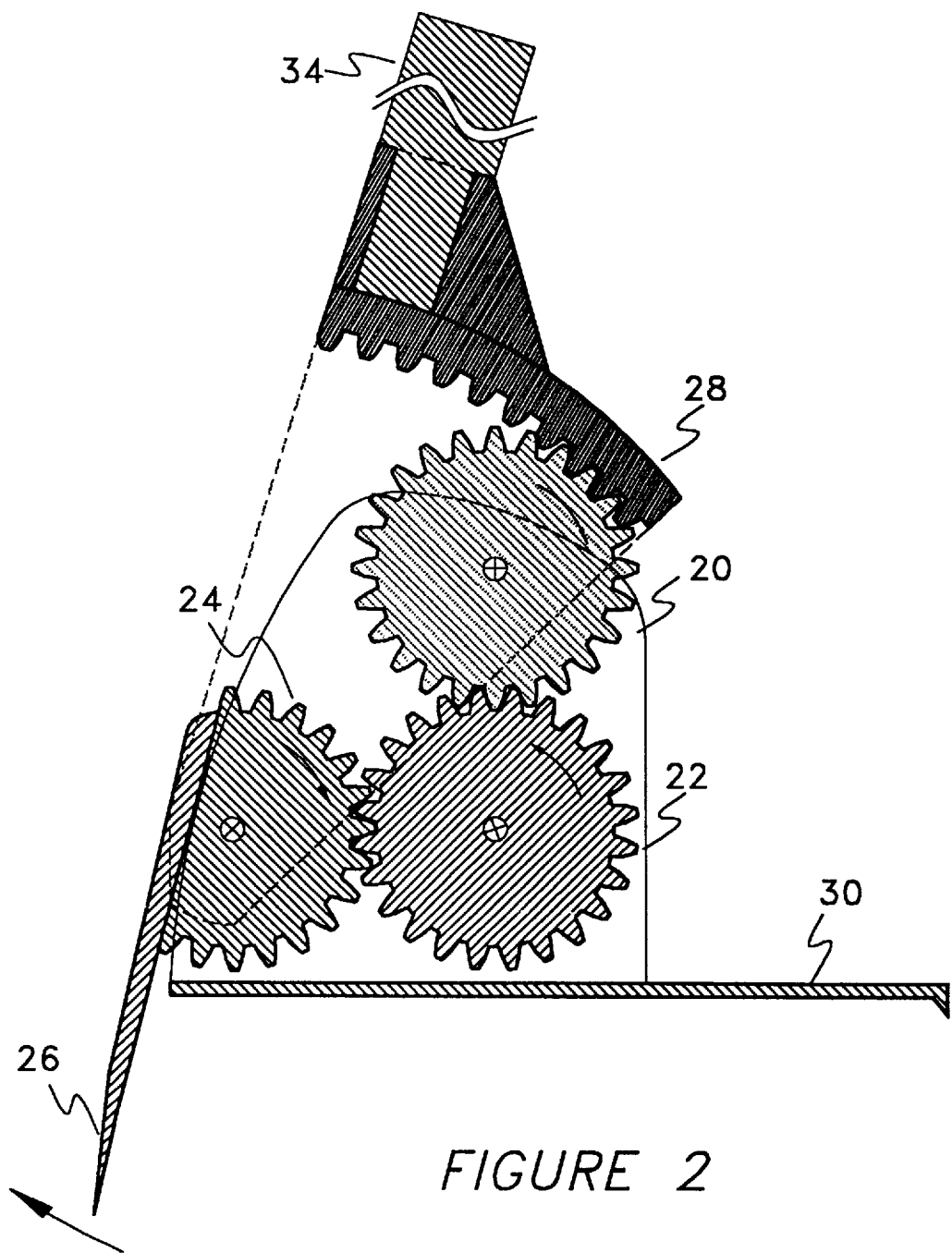
FIG. 2 is a cross-sectional illustration of the operation of the present invention.
Figure 3:
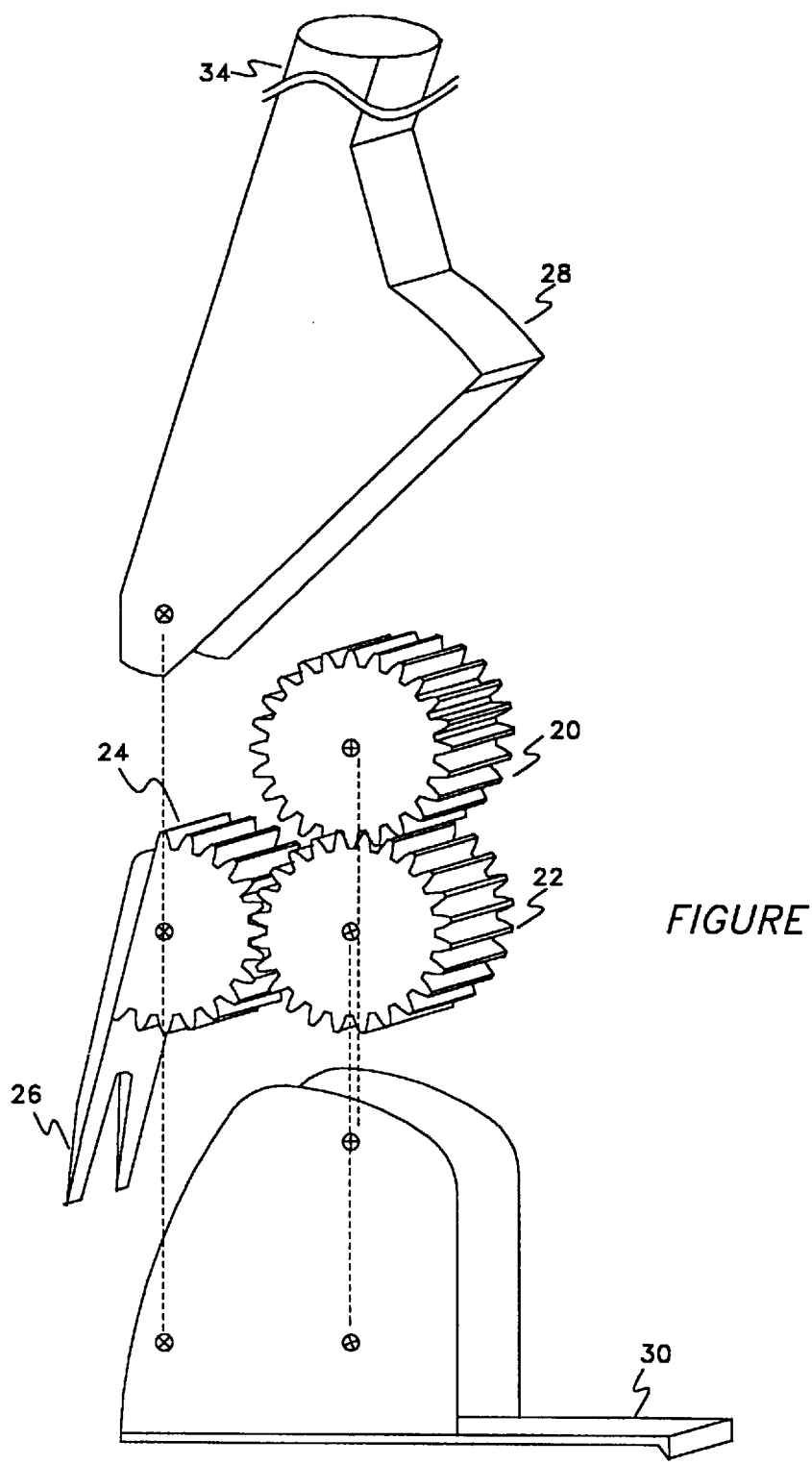
FIG. 3 is an exploded view of the present invention.

| Reference Numerals in Drawings | |
| --- | --- |
| 20 first gear | 22 second gear |
| 24 third gear | 26 contacting means or folk |
| 28 inner gear | 30 base |
| 32 upper assembly | 34 handle |

DESCRIPTION

The invented weed puller comprises a first gear 20, a second gear 22, a third gear 24, all are mounted onto the two vertical supports of the base 30, an inner gear 28 mounted onto an upper assembly 32 which includes a handle 34, and an contacting means 26 mounted on the third gear 24. The upper assembly 32 has the same axis of rotation as the third gear 24. The inner gear 28 drives the first gear 20, which in turn drives the second gear 22, which drives the third gear 24. The rotation of the third gear 24 causes the contacting means 26 to remove weed.

From the description above, a number of advantages of the invented weed puller become evident:

(a) the handle 34 provides the necessary leverage to rotate the gears to pull weed. A slight pull on the handle 34 for about a foot is all it takes to pull weed;

(b) the base 30 spreads the force involved in the removal of weed to a large area to prevent soil compacting;

(c) the small fork 26 does not make a big hole in the ground, allowing very selective weed pulling next to a desired plant.

Operation

In a typical embodiment of this weed puller, the rotation angle of the handle 34 is multiplied by 3 to 5 times or more by means of the gears. Thus if a 90-degree rotation of the fork is required to pull a weed, the handle 34 only needs to rotate 18 to 30 degrees. This corresponds to a movement of the top of the handle 34 by a foot or two. Furthermore, this weed puller is probably the only one to use the principle of leverage to do the task: the force at the tip of the fork 26 is demultiplied many times by the ratio of the length of the handle 34 to the length of the fork 26, which is typically 18 times, divided by the ratio resulting from the arrangement of the gears, which is typically 3.

To illustrate the operation of this weed puller, let's imagine the handle 34 is pulled to the right. This will cause the first gear 20 to rotate clockwise. The first gear will drive the second gear 22 to rotate counterclockwise. The second gear 22 will then drive the third gear 24 clockwise, causing the fork 26 to rotate by the same angle around the axis of the third gear 24, which is also the rotational axis of the upper assembly 32 containing the inner gear 28. The rotation demultiplication ratio is determined by the ratio of the radius of the inner gear 28 to the radius of the third gear 24. This ratio can be easily modified by an appropriate positioning of the three axes of rotation of the three gears.

Summary, Ramification and Scope

Accordingly the reader will see that the invented weed puller is extremely easy to use: the user just sticks the fork around the weed then pulls the handle toward her by about a foot without using much effort at all. This is due to the leverage principle.

Furthermore the invented weed puller has additional advantages in that it pulls weed out very selectively without compacting or pushing any soil.

Its gears can be made out of light weight plastic such as DELRIN or polyurethane.

Any rotation multiplication can be achieved by judiciously choosing the centers of rotation of the gears.

The gears can be identical, minimizing tooling and production cost.

The same design can be used to uproot nail from wood, or other similar uprooting applications.

While the preferred embodiment of the present invention has been shown and described herein, it will be obvious that such embodiment is provided by way of example only. Numerous variations, changes, and substitutions will occur to those of skill in the art without departing from the invention herein. Thus the scope of the invention should be determined by the appended claims and their legal equivalents, rather than by the example given.

I claim:

1. An apparatus for uprooting weeds comprising:
   a handle rotating around a first axis mounted on
   a base to be laid down against the ground, said base comprising a substantially flat bottom and two vertical sides,
   a contacting means rotating around said first axis,
   a co-axial co-directional rotation multiplying means rotatably transmitting force applied transversally on said handle to said contacting means, said rotation multiplying means being mounted on said base and linking said handle to said contacting means, said rotation multiplying means comprises a first gear, said first gear being an inner gear rotating around said first axis mounted on said base, a second gear rotating around a second axis mounted on said base, a third gear rotating around a third axis mounted on said base, and a fourth gear rotating around said first axis and bearing said contacting means, the rotation of said first gear being transmitted to said second gear, the rotation of said second gear being transmitted to said third gear and the rotation of said third gear being transmitted to said fourth gear,
   whereby the rotation of said handle is multiplied by said co-axial co-directional rotation multiplying means causing said contacting means to rotate many times more than the rotation of said handle, and the leverage due to the length of said handle minimizes the effort required from the user.

2. The apparatus of claim 1 wherein said second gear and said third gear and said fourth gear have a same diameter.

3. The apparatus of claim 1 wherein said first gear is part of a top structure, the sides of said top structure being outside said sides of said base.

4. The apparatus of claim 3 wherein the rotation of said top structure relative to said base is limited in one direction by said sides of said top structure hitting a block which is part of said base.

5. The apparatus of claim 4 wherein said block is part of said third axis.

6. The apparatus of claim 3 wherein said top structure contains a cavity for mounting said handle.

7. The apparatus of claim 1 wherein said contacting means has a forked end.

8. The apparatus of claim 7 wherein each element of said forked end has a substantially triangular cross-section.

9. The apparatus of claim 1 wherein said contacting means comprises two spring-loaded rotatable grabbing means.

10. The apparatus of claim 9 wherein said grabbing means have substantially saw-like teeth.

11. The apparatus of claim 1 wherein said base has substantially sharp elements at the bottom to immobilize said base against the ground.

12. The apparatus of claim 1 wherein said handle is at an initial angle less than 80 degrees relative to said bottom of said base.

13. The apparatus of claim 1 wherein said contacting means is returned to an initial position prior to uprooting action by means of a spring.

14. A method for uprooting weeds comprising
   pushing a contacting means onto a weed,
   rotating said contacting means around a first axis, said first axis being mounted on a base comprising a substantially flat bottom and two vertical sides, by pulling a handle in a direction substantially perpendicular to said handle, said handle rotating around said first axis and being mounted on a top structure,
   reducing the rotation angle of said handle relative to the rotation angle of said contacting means by a co-axial co-directional rotation multiplying means mounted on said base said co-axial co-directional rotation multiplying means comprises a first gear, said first gear being an inner gear rotating around said first axis mounted on said base, a second gear rotating around a second axis mounted on said base, a third gear rotating around a third axis mounted on said base, and a fourth gear rotating around said first axis and bearing said contacting means, the rotation of said first gear being transmitted to said second gear, the rotation of said second gear being transmitted to said third gear and the rotation of said third gear being transmitted to said fourth gear.

15. The method of claim 14 wherein said second gear and said third gear and said fourth gear have a same diameter.

16. The method of claim 14 wherein said first gear is part of a top structure, the sides of said top structure being outside said sides of said base.

17. The method of claim 14 wherein the rotation of said top structure relative to said base is limited in one direction by said sides of said top structure hitting a block which is part of said base.

18. The method of claim 17 wherein said block is part of said third axis.

19. The method of claim 16 wherein said top structure contains a cavity for mounting said handle.

20. The method of claim 14 wherein said contacting means has a forked end.

21. The method of claim 20 wherein each element of said forked end has a substantially triangular cross-section.

22. The method of claim 14 wherein said contacting means comprises two spring-loaded rotatable grabbing means.

23. The method of claim 20 wherein said grabbing means have substantially saw-like teeth.

24. The method of claim 14 wherein said base has substantially sharp elements at the bottom to immobilize said base against the ground.

25. The method of claim 14 wherein said handle is at an initial angle less than 80 degrees relative to said bottom of said base.

26. The method of claim 14 wherein said contacting means is returned to an initial position prior to uprooting action by means of a spring.

* * * * *